United States Patent Office 3,244,701
Patented Apr. 5, 1966

3,244,701
BUTADIENE-CARBOXYLIC ACID PIPERAZIDES
Ernst Jürgens, Bad Soden, Taunus, Heinz Loewe, Kelkheim, Taunus, and Georg Lämmler and Wilhelm Hohorst, Frankfurt am Main, Germany, assignors to Farbwerke Hoechst Aktiengesellschaft vormals Meister Lucius & Bruning, Frankfurt am Main, Germany, a corporation of Germany
No Drawing. Filed July 22, 1963, Ser. No. 296,478
Claims priority, application Germany, Feb. 5, 1963,
F 38,930
17 Claims. (Cl. 260—240)

The present invention relates to butadiene-carboxylic acid piperazides of the general Formula I

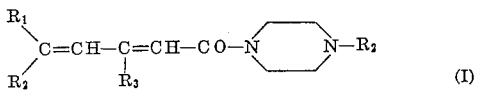  (I)

wherein $R_1$ and $R_2$ each represent a phenyl radical which may be substituted once or several times by halogen atoms, alkyl groups of low molecular weight, alkoxy groups of low molecular weight, phenyl groups which may be substituted, and/or phenoxy groups which may be substituted, $R_3$ stands for a methyl group or a 2-phenyl-vinyl group which may be substituted in the benzene nucleus by one or several halogen atoms, low molecular alkyl- and/or alkoxy groups, and $R_4$ represents hydrogen, a low molecular alkyl-, cycloalkyl or phenyl-alkyl group which may be mono- or multi-substituted, and their salts which are valuable medicaments distinguished by strong anthelmintic properties.

The present invention likewise comprises preparations containing butadiene-carboxylic acid piperazides of the general Formula I or their salts together with the pharmaceutically usual auxiliaries and carrier substances.

The invention further relates to a process for the production of carboxylic acid piperazides corresponding to the general Formula I

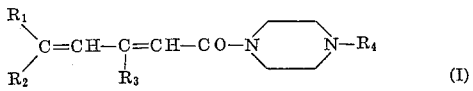  (I)

wherein $R_1$, $R_2$, $R_3$ and $R_4$ have the meanings given above, which comprises reacting in known manner a butadiene-carboxylic acid of the general Formula II

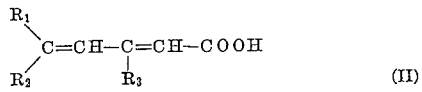  (II)

wherein $R_1$, $R_2$, $R_3$ have the meanings given above, or a reactive derivative thereof with a piperazine of the general Formula III

  (III)

wherein $R_4$ has the meaning given above, and converting the products obtained into the corresponding salts, if desired, by means of physiologically tolerated acids.

The butadiene-carboxylic acids to be used as starting products according to the process of the invention are substituted at the carbon atom 4 by phenyl radicals which may carry in the nucleus one or several halogen atoms, low molecular alkyl groups, low molecular alkoxy groups, phenyl- and/or phenyloxy groups which may be substituted.

Likewise the 2-phenyl-vinyl radical which may be present in 2-position of the butadiene-carboxylic acid may be substituted in the benzene nucleus by one or several halogen atoms, by low-molecular alkyl- and/or alkoxy groups. For the above-mentioned substitutions there may be used as halogen atoms all halogens, particularly chlorine and fluorine, alkyl groups of low molecular weight having from 1 to 4 carbon atoms, in particular the methyl group, and as alkoxy groups of low molecular weight, for example, the ethoxy-, propoxy-, isopropoxy- or butoxy group, preferably the methoxy group. As examples there may be mentioned: 2- or 3- or 4-chloro- or bromo- or fluoro- or methyl- or methoxy- or ethoxy-phenyl, 2,4- or 3,4- or 3,5-dichloro- or dibromo- or difluoro- or dimethyl- or dimethoxy-phenyl, 3-methyl-5 chloro - phenyl, 2 - chloro-5 - methyl - phenyl, 2 - chloro-4-methoxy-phenyl, 3,4,5-trichloro-phenyl, 2-[4-chloro-phenyl] - vinyl, 2 - [4 - methoxy - phenyl] - vinyl, 2-[2,4-dichloro-phenyl]-vinyl. As phenyl- and phenyloxy groups present in the radicals $R_1$ and $R_2$ and substituting the phenyl radical (which, on their part, may be substituted by one or several halogen atoms, low molecular alkyl- and/or alkoxy groups), there may be mentioned for example the phenyl-, 4-chloro- or bromo- or fluoro-phenyl, 2,4-dichloro-phenyl, 4-methoxy-phenyl, phenoxy- and p-chloro-phenoxy radicals.

The butadiene-carboxylic acids can likewise be reacted in the form of their reactive derivatives, acid chlorides being especially suitable. There can, however, likewise be used other reactive derivatives such as butadiene-carboxylic acid fluorides, butadiene-carboxylic acid bromides, butadiene-carboxylic acid esters, butadiene-carboxylic acid anhydrides, mixed anhydrides with carbonic acid semi-esters, butadiene-carboxylic acid azides, butadiene-carboxylic acid imidazolides and the like.

As second reaction component according to the process of the present invention piperazine or N-monosubstituted piperazines are mentioned. As radicals $R_4$ representing branched or unbranched alkyl- or cycloalkyl radicals which may be substituted by halogen, hydroxy or alkoxy groups of low molecular weight, or phenyl-alkyl radicals substituted in the benzene nucleus by halogen, alkyl or alkoxy groups of low molecular weight and by which one of the two cyclic nitrogen atoms of the piperazine may be substituted, may be mentioned, for example, methyl, ethyl, propyl, isopropyl, butyl, isoamyl, hexyl, β-hydroxy-ethyl, β,γ-dihydroxy-propyl, β-hydroxy-γ-chloro-propyl, methoxy-methyl, β-methoxy-ethyl, cyclohexyl, methyl-cyclohexyl, benzyl, 4-chlorobenzyl, 4-methyl-benzyl, phenyl-ethyl, ethyl-mercapto-methyl, ethyl-mercapto-ethyl, benzyl-mercapto-methyl, and benzyl-mercapto-ethyl.

According to the process of the invention the reaction of the carboxylic acid with the piperazine base in order to obtain the carboxylic acid piperazide occurs with separation of 1 mol of water. It is, therefore, useful to operate in the presence of a water binding substance. For this purpose, carbodiimides such as dicyclohexyl-carbodiimide, are suitable. They are thereby converted into the corresponding ureas. The reaction is advantageously carried out in an inert solvent. As such, there are mentioned, above all, aliphatic or aromatic hydrocarbons as well as aliphatic or aromatic ethers, for example, dioxane, tetrahydrofurane, methylene-chloride, dimethyl-formamide or acetonitrile. The reaction can be carried out at a low or a moderately elevated temperature, preferably, however, at room temperature. In most cases, the urea that has formed crystallizes out of the reaction mixture and can thus easily be separated; the piperazide can then be isolated without difficulties by concentrating the filtrate.

It is suitable to use instead of the carboxylic acid its reactive derivatives. As such, there enter into consideration butadiene-carboxylic acid chlorides, but likewise other derivatives, for instance, the corresponding butadiene-carboxylic acid fluorides, butadiene-carboxylic acid bromides, butadiene-carboxylic acid esters, butadiene-carboxylic acid anhydrides, mixed anhydrides with carbonic acid semi-esters, butadiene-carboxylic acid azides or butadiene-carboxylic acid imidazolides.

If acid chlorides are used, which are obtained in the usual manner from the corresponding acids, for instance by causing thionyl-chloride to act thereon, the process of the invention can be materialized by reacting the acid chlorides with the piperazine base in the presence of a solvent. For this purpose, there are suitable, for instance, aliphatic or aromatic hydrocarbons such as benzine, benzene or toluene, ethers such as diethyl ether, diisopropyl ether, anisol, tetrahydrofurane or dioxane, esters such as ethyl-acetate or butyl-acetate, ketones such as acetone or methyl-ethyl-ketone, amides such as dimethyl-formamide, or nitriles such as acetonitrile. The reaction may be carried out at a low as well as at an elevated temperature. It is of advantage to start the reaction at room temperature and to achieve it by heating, for instance, to the boiling point of the solvent.

If the reactants are used in equimolar amounts, the hydrochlorides of the piperazides are formed which—with the appropriate selection of the solvents—mostly separate in crystalline form and can be isolated by filtration. It is likewise possible to capture the hydrogen halide formed in the course of the reaction by an acid-binding agent. For this purpose there are appropriate, for instance, inorganic bases such as sodium carbonate or tertiary amines such as triethylamine, dimethyl-aniline or pyridine or likewise an excess of the piperazine taking part in the reaction. In these cases the free carboxylic acid piperazides are formed which in most cases are maintained in solution and which are obtained therefrom in the usual manner, for instance by concentrating the solution by evaporation. When, for the reaction, the piperazine is used in the form of a salt, the acid-binding agent is suitably used in an appropriate amount in order to liberate the base from the piperazine salt. The free carboxylic acid piperazides are then likewise obtained which may be isolated as described above. In an analogous manner other reactive carboxylic acid derivatives may likewise be reacted with the corresponding piperazines, for instance, the above-mentioned carboxylic acid bromides or fluorides, carboxylic acid anhydrides, carboxylic acid azides or carboxylic acid imidazolides.

It is of advantage to prepare the piperazides of the present invention likewise via the mixed anhydrides with carbonic acid semi-esters. This process is distinguished by especially protective conditions and is suitably applied if there exists the danger that the acid chlorides further react with one another in the manner of a reaction according to Friedel-Crafts. For this purpose, the butadiene-carboxylic acids are reacted in an appropriate solvent such as, for instance, dioxane or tetrahydrofurane, at a temperature between −20 and +30° C., preferably at −10° C., in the presence of a tertiary base such as triethylamine, with a carbonic acid semi-ester, for example, chloroformic acid ethyl ester, and the mixed anhydride formed is reacted with an N-monosubstituted piperazine. This reaction phase likewise can be realized at a temperature between −20 and +50° C. It is appropriately started at a temperature below 0° C. and achieved at room temperature. Upon elimination of the hydrochloride of the tertiary base and evaporation of the solvent, the piperazide formed is isolated, for example, as hydrochloride by treating with aqueous hydrochloric acid the residue dissolved in an appropriate solvent such as ether or ethyl acetate. From these crude hydrochlorides the free piperazides are obtained by dissolution in water and addition of alkaline agents, for instance dilute sodium hydroxide solution, ammonia or barium-hydroxide. In the case of stereoisomeric forms the crystallization of the piperazide can, in many cases, only be realized by trituration with the glass rod and addition of ether. It is likewise possible to take up the piperazide formed after treatment by means of alkalies, favorably in an appropriate organic solvent immiscible with water, for instance ether, ethyl acetate or benzene and, after evaporation, to crystallize the residue by adding, for instance, saturated hydrocarbons such as hexane or a mixture of its higher homologs. By dissolving and allowing the compounds to crystallize in appropriate solvents such as ligroin, benzene, ethyl acetate or a mixture of these solvents—which proceeding may be repeated—stereo-chemically uniform forms of the free piperazides can be obtained. In some cases, they remain, however, of oily constitution and cannot further be purified by distillation. As monoacid bases piperazides form salts with inorganic or organic acids which salts are in most cases obtained in crystalline form. As acids suitable for salt formation there are mentioned, for instance: hydrochloric acid, acetic acid, citric acid and maleic acid. According to the type of substitutent and the acid used for salt formation they are more or less soluble in water. The aqueous solutions with considerably lowered surface tension show, in general, pH-values of 4 to 6.

The butadiene-carboxylic acid piperazides prepared according to the process of the present invention as such or in the form of their salts with non-toxic acids may be used as medicaments. They show a strong anthelmintic action directed, above all, on various kinds of liver flukes, especially the small liver fluke or lancet fluke (*Dicrocoelium dendriticum*). The infection of domestic animals by liver flukes is of great economic importance in all countries of the world. Whereas a great number of medicaments is already known as being effective against the large liver fluke (*Fasciola hepatica*) and used on a large scale in veterinary practice, no specifically active chemotherapeutical substance against *Dicrocoelium dendriticum* is hitherto known. Up to now, experimental chemotherapeutical examinations could only be carried out to a small extent on naturally infected sheep, since the hitherto obtained results of scientific examinations concerning the biology of the lancet fluke were not sufficient to build up the total development cycle under laboratory conditions. Only the newer findings by Hohorst and Graefe (Naturwiss. 48:229 (1961)) concerning the decesive part played by the ants in the development of the lancet fluke and the findings by Hohorst and Lämmler (Z. Tropenmd. 1962 in print) concerning the qualification of various laboratory animals as final hosts for *Dicrocoelium dendriticum* gave the possibility of building up in the laboratory the cycle of the lancet fluke and of carrying out said experimental-therapeutical tests.

Within the scope of said examinations the excellent and surprising effect of the products of the invention was found. It is demonstrated in the following by some test results. The chemotherapeutical examinations were carried out by experimental tests on golden hamsters infected with *Dicrocoelium dendriticum*. The tested compounds were orally given to the animals once a day for three successive days. The success of the treatment was demonstrated by an examination of the feces with the aid of the Telemann process prior to the treatment and by two further examinations on the 14th and 20th days after the treatment and by autopsy of the animals. As curative dose there was determined the dose sufficient to remove the infestation by lancet flukes. The following table shows the values ascertained for some of the products obtained according to the process of the present invention when given to golden hamsters.

TABLE

[Results of chemotherapeutical examinations on golden hamsters (parasite: *Dicrocoelium dendriticum*)]

| Product obtained according to the invention | Curative dose, per oz. (mg./kg.) of body weight |
|---|---|
| 2-methyl-4,4-bis-(4'-chlorophenyl)-butadiene-carboxylic acid-(N-methyl-piperazide)-hydrochloride | 3 x 50 |
| 2-methyl-4-(4'-chlorophenyl)-4-(3'',5''-dichlorophenyl)-butadiene-carboxylic acid-(N-methyl-piperazide)-hydrochloride | 3 x 75 |
| 2-methyl-4-(4'-chlorophenyl)-4-(4''-methyl-phenyl)-butadiene-carboxylic acid-(N-methyl-piperazide)-hydrochloride | 3 x 200 |
| 2-methyl-4-(4'-chlorophenyl)-4-(4''-fluorophenyl)-butadiene-carboxylic acid-(N'-methyl-piperazide)-hydrochloride | 3 x 50 |
| 2-methyl-4,4-bis-(4'-methyl-phenyl)-butadiene-carboxylic acid-(N'-methyl-piperazide)-hydrochloride | 3 x 200 |
| 2-methyl-4-(2'-chlorophenyl)-4-(4''-methoxy-phenyl)-butadiene-carboxylic acid-(N'-methyl-piperazide)-hydrochloride | 3 x 100 |
| 2-methyl-4-(4'-chlorophenyl)-4-[4''-(p-chlorophenoxyphenyl)]-butadiene-carboxylic acid-(N'-methyl-piperazide)-hydrochloride | 3 x 200 |
| 2-[β-(4'-chlorophenyl)-vinyl]-4,4-bis-(4''-chlorophenyl)-butadiene-carboxylic acid-(N'-methylpiperazide)-hydrochloride | 3 x 400 |

The products of the invention may be applied as such or in the form of the corresponding salts, if desired with admixture of the pharmaceutically usual inert auxiliaries and carrier substances, orally or parenterally, preferably, however, orally. As preparation forms there may be applied tablets or suspendable powders which may be given per se or in admixture with the food to the animals. A powder suspendable in water may contain in addition to the products of the invention as auxiliary or carrier substance likewise finely divided silicic acid or coco-lorol-sulfonate as dispersing agent. For the preparation of tablets the substances usually used as basic ingredients for tablets, for instance corn starch, lactose, pectines, especially ultra-amylopectine (Na-amylopectine-glycolate), talc and the like may be used. In certain therapeutical cases the addition of other anthelmintics and/or antibiotics may be of interest. The galenic preparations are produced according to the usual methods.

If the products of the invention—if desired—are used in the form of suspendable powders, they may contain, for instance, about 5 to 90%, preferably however, 30 to 80 or 40 to 60% of the anthelmintic substance.

Tablets which may be made into a suspension contain, for instance, between 5 and 60%, preferably between 20 and 50% of the active substance. The active substances may also be applied in the form of solutions or suspensions, the content of active substance of these preparations depending on the solubility of the piperazides used in each case.

The following examples illustrate the invention.

*Example 1.—2-methyl-4,4-bis-(4-chlorophenyl)-butadiene-carboxylic acid-(N'-methyl-piperazide)*

A mixture of 10 grams of 2-methyl-4,4-bis-(4-chlorophenyl)-butadiene-carboxylic acid and 8 milliliters of recently distilled thionylchloride is heated while adding 2 drops of dimethylformamide and careful exclusion of atmospheric moisture to 40° C. until the evolution of hydrogen chloride is terminated and a clear solution is formed. The excessive thionyl-chloride is then eliminated by distillation under reduced pressure and the residue is taken up with 50 milliliters of ligroin. A solution of 3 grams of N-methyl-piperazine in 50 milliliters of ligroin is added while stirring, whereby the desired 2-methyl-4,4-bis-(4-chlorophenyl) - butadiene-carboxylic acid-(N'-methyl-piperazine) separates in the form of the hydrochloride. It is filtered off with suction and additionally washed with petroleum ether or ether. The crude hydrochloride thus obtained is dissolved in 150 milliliters of water and the free base is separated by adding sodium hydroxide solution until an alkaline reaction occurs. The base is at first of smeary constitution but on trituration with the glass rod and addition of a small amount of ether it soon solidifies. It is filtered off with suction, washed with water until showing a neutral reaction and dried in the desiccator over potassium hydroxide solution. For purification the piperazide is recrystallized from 200 milliliters of a mixture of equal parts of ligroin and acetic acid ester with addition of charcoal. The yield amounts to 5.5 grams. The melting point of the 2-methyl-4,4-bis-(4-chlorophenyl) - butadiene-carboxylic acid-(N'-methyl-piperazide) amounts to 165° C.

For conversion into the hydrochloride the base is dissolved in 200 milliliters of ethyl acetate and acidified with alcoholic hydrochloric acid, whereupon the hydrochloride separates in the form of a thick crystal magma easily soluble in water and melting at 228° C.

For preparing the 2-methyl-4,4-bis-(4-chlorophenyl)-butadiene-carboxylic acid, 50 grams of fresh sodium methylate are added while stirring to a mixture consisting of 127 grams of 4,4'-dichloro-benzophenone, 65 grams of dimethyl-acrylic acid ester and 500 milliliters of dimethyl-sulfoxide. The temperature of the mixture rises considerably, the mixture becomes dark violet and then dark brown and, finally, solidifies. After cooling, it is diluted by means of 2 liters of water, undissolved impurities are filtered off and the free acid is precipitated by adding excessive acetic acid. It is filtered off with suction, thoroughly washed with water and the crude product thus obtained is crystallized from ethyl alcohol with addition of charcoal. The yield amounts to 96 grams. The melting point of the 2-methyl-4,4-bis-(4-chlorophenyl) - butadiene - carboxylic acid amounts to 175° C.

In an analogous manner there are obtained the piperazides indicated in the following table by the reaction of the acid chloride, prepared from the corresponding butadiene-carboxylic acid (reaction component A), with a corresponding piperazine (reaction component B).

| Example | Product obtained | Reaction components | Reaction conditions | Properties (melting point, yield) | |
|---|---|---|---|---|---|
| | | | | Free base | Hydrochloride |
| 2 | 2-methyl-4-phenyl-4-(3,4-dichlorophenyl)-butadiene-carboxylic-acid-N'-methyl-piperazide. | A: 2-methyl-4-phenyl-4-(3,4-dichloro-phenyl)-butadiene-carboxylic acid (11.1 g). B: N-methyl-piperazine (3.3 g). | A in ether, B added (in acetone). Concentration by evaporation. Mixing the residue with acetic ester. | 106° C. (ligroine), 8 g. | 193 °C. |
| 3 | 2-methyl-4-(4-chlorophenyl)-4-(3,5-dichlorophenyl)-butadiene-carboxylic-acid-N'-methyl-piperazide. | A: 2-methyl-4-(4-chlorophenyl)-4-(3,5-dichlorophenyl)-butadiene-carboxylic acid (18.4 g.) B: N-methyl-piperazine (5 g). | A, B in acetone. Concentration by evaporation. Mixing the residue with acetic ester. | 96° C. (ligroine), 13 g. | 196° C., water-solubility: moderate. |

| Example | Product obtained | Reaction components | Reaction conditions | Properties (melting point, yield) | |
|---|---|---|---|---|---|
| | | | | Free base | Hydrochloride |
| 4 | 2-methyl-4-phenyl-4-(3,5-dichlorophenyl)-butadiene-carboxylic-acid-N'-methyl-piperazide. | A: 2-methyl-4-phenyl-4-(3,5-dichlorophenyl)-butadiene-carboxylic acid. B: N-methyl-piperazine (5 g). | cf. Example 3 | Hydrate: 53° C.–58° C. (from ligroine, addition of a little water). | 200° C. |
| 5 | 2-methyl-4-(4-chlorophenyl)-4-(4-bromophenyl)-butadiene-carboxylic-acid-N'-methyl-piperazide. | A: 2-methyl-4-(4-chlorophenyl)-4-(4-bromophenyl)-butadiene carboxylic acid (18.8 g.). B: N-methyl-piperazine (5 g). | cf. Example 3 | 154° C. (acetic ester), 14 g. | 236° C., 13 g. |
| 6 | 2-methyl-4-phenyl-4-(2,4-dichlorophenyl)-butadiene-carboxylic-acid-N'-methyl-piperazide. | A: 2-methyl-4-phenyl-4-(2,4-dichlorophenyl)-butadiene-carboxylic acid (16.7 g.). B: N-methyl-piperazine (5 g.). | cf. Example 3 | Viscous | 210° C. (solution in methanol precipitation with acetic ester), 17 g. |
| 7 | 2-methyl-4,4-bis-(4-bromophenyl)-butadiene-carboxylic acid N'-methyl-piperazide. | A: 2-methyl-4,4-bis-(4-bromophenyl)-butadiene-carboxylic acid (21 g.). B: N-methyl-piperazine (5 g.). | cf. Example 3 | 152° C. (benzene/petrolether =1/1) 17 g. | 228° C. |
| 8 | 2-methyl-4-(4-chlorophenyl)-4-(2,4-dichlorophenyl)-butadiene-carboxylic-acid-N'-methyl-piperazide. | A: 2-methyl-4-(4-chlorophenyl)-4-(2,4-dichlorophenyl)-butadiene-carboxylic acid (18.4 g.). B: N-methyl-piperazine (5 g.). | cf. Example 3 | | 208° C. (cf. Example 6) 14 g. |
| 9 | 2-methyl-4-(4-chloro-phenyl)-4-(2-chloro-phenyl)-butadiene-carboxylic-acid-N'-methyl-piperazide. | A: 2-methyl-4-(4-chlorophenyl)-4-(2-chloro-phenyl)-butadiene-carboxylic acid (16.7 g.). B: N-methyl-piperazine (5 g.). | cf. Example 3 | 137° C. (ligroine) | 223° C., 15.5 g. |
| 10 | 2-methyl-4-(4-chlorophenyl)-4-(4-methylphenyl)-butadienecarboxylic-acid-N'-methyl-piperazide. | A: 2-methyl-4-(4-chloro-phenyl)-4-(4-methyl-phenyl)-butadiene-carboxylic acid (15.6 g.). B: N-methyl-piperazine (5 g.). | cf. Example 3 | 143° C. (crystallized from the ether solution). | 202° C., 13.4 g. |
| 11 | 2-methyl-4-(4-chlorophenyl)-4-(3-chloro-phenyl)-butadiene-carboxylic-acid N'-methyl-piperazide. | A: 2-methyl-4-(4-chloro-phenyl)-4-(3-chloro-phenyl)-butadiene-carboxylic acid (16.7 g.), melting point of the carboxylic acid 192° C. B: N-methyl-piperazine (7 g.). | cf. Example 3 | Visous | 191° C., 13 g. |
| 12 | 2-methyl-4-(4-chloro-phenyl)-4-(3-chloro-phenyl)-butadiene-carboxylic-acid-N'-methyl-piperazide. | A: 2-methyl-4-(4-chloro-phenyl)-4-(3-chloro-phenyl)-butadiene-carboxylic acid (16.7 g.) melting point of the carboxylic acid: 156° C. (stereoisomer to 11 A). B: N-methyl-piperazine (7 g.). | cf. Example 3 | | 212° C., 14.2 g. |
| 13 | 2-methyl-4-(4-chloro-phenyl)-4-(2-methyl-phenyl)-butadiene-carboxylic-acid-N'-methyl-piperazide. | A: 2-methyl-4-(4-chloro-phenyl)-4-(2-methyl-phenyl)-butadiene-carboxylic acid (15.6 g.). B: N-methyl-piperazine (5 g.). | cf. Example 3 | 115° C. (ligroine), 9.5 g. | 231° C., 10 g. water-solubility: moderate. |
| 14 | 2-methyl-4-(4-methyl-phenyl)-4-(2-chloro-phenyl)-butadiene-carboxylic-acid-N'-methyl-piperazide. | A: 2-methyl-4-(4-methyl-phenyl)-4-(2-chloro-phenyl)-butadienecarboxylic acid (15.6 g.). B: N-methyl-piperazine (5 g.). | cf. Example 3 | Viscous | 225° C. 16 g. |
| 15 | 2-methyl-4-(4-methylphenyl)-4-(2,4''-dichloro-phenyl)-butadiene-carboxylic-acid-N'-methyl-piperazide. | A: 2-methyl-4-(4-methyl-phenyl)-4-(2,4-dichloro-phenyl)-butadiene-carboxylic-acid (17.4 g.). B: N-methyl-piperazine (6 g.). | cf. Example 3 | Viscous | 226° C., 12.5 g. |
| 16 | 2-methyl-4-(4-chloro-phenyl)-4-(4-chloro-diphenyl)-butadiene-carboxylic-acid-N'-methyl-piperazide. | A: 2-methyl-4-(4-chloro-phenyl)-4-(4-chloro-diphenyl)-butadiene-carboxylic acid (20.5 g.). B: N-methyl-piperazine (5.5 g.). | cf. Example 3, reaction temperature 60° C. | Viscous | 230° C., 8.8 g. water-solubility: moderate. |
| 17 | 2-methyl-4-(4-chloro-phenyl)-4-(2-chloro-5-methyl-phenyl)-butadiene-carboxylic-acid-N'-methyl-piperazide. | A: 2-methyl-4-(4-chloro-phenyl)-4-(2-chloro-5-methyl-phenyl)-butadiene-carboxylic acid (17.5 g.). B: N-methyl-piperazine (5 g.). | cf. Example 3 | Viscous | 204° C. |
| 18 | 2-[β-(4-chloro-phenyl)-vinyl]-4,4-bis-(4'-chloro-phenyl)-butadiene-carboxylic-acid-N'-methyl-piperazide. | A: 2-[β-(4-chlorophenyl)-vinyl]-4,4-bis-(4-chloro-phenyl)-butadiene-carboxylic acid (22.5 g.). B: N-methyl-piperazine (5 g.). | cf. Example 3 | Viscous | 233° C., 8.8 g., sparingly water-soluble. |

| Example | Product obtained | Reaction components | Reaction conditions | Properties (melting point, yield) | |
|---|---|---|---|---|---|
| | | | | Free base | Hydrochloride |
| 19 | 2-methyl-4,4-bis-(4-chloro-phenyl)-butadiene-carboxylic-acid-N'-isopropyl-piperazide. | A: 2-methyl-4,4-bis-(4-chlorophenyl)-butadiene-carboxylic acid (16.7 g.). B: N-isopropyl-piperazine (6.5 g.). | A,B in acetic ester, separation of the hydrochloride with spontaneous heating. | Viscous | 230° C., 12 g., sparingly water-soluble. |
| 20 | 2-methyl-4,4-bis-(4-chloro-phenyl)-butadiene-carboxylic-acid-N'-benzyl-piperazide. | A: 2-methyl-4,4-bis-(4-chlorophenyl)-butadiene-carboxylic acid (16.5 g.). B: N-benzyl-piperazine (6.6 g.). | cf. Example 19 | Viscous | 228° C., 17.5 g., sparingly water-soluble. |
| 21 | 2-methyl-4,4-bis-(4-chloro-phenyl)-butadiene-carboxylic-acid-N'-ethyl-piperazide. | A: 2-methyl-4,4-bis-(4-chlorophenyl)-butadiene-carboxylic acid (16.7 g.). B: N-ethyl-piperazine (6 g.). | cf. Example 19 | Viscous | 236° C., 16 g., sparingly water-soluble. |
| 22 | 2-methyl-4,4-bis-(4-chloro-phenyl)-butadiene-carboxylic-acid-N'-propyl-piperazide. | A: 2-methyl-4,4-bis-(4-chlorophenyl)-butadiene-carboxylic acid (16.7 g.). B: N-propyl-piperazine (6.5 g.). | cf. Example 19 | Viscous | 211° C., 18 g., sparingly water-soluble. |
| 23 | 2-methyl-4,4-bis-(4-chloro-phenyl)-butadiene-carboxylic-acid-N'-butyl-piperazide. | A: 2-methyl-4,4-bis-(4-chlorophenyl)-butadiene-carboxylic acid (16.7 g.). B: N-butyl-piperazine (7.1 g.). | cf. example 19 | Viscous | 171° C., 12 g., sparingly water-soluble. |
| 24 | 2-methyl-4,4-bis-(4-chloro-phenyl)-butadiene-carboxylic acid-N'-(2-hydroxy-ethyl)-piperazide. | A: 2-methyl-4,4-bis (4-chlorophenyl)-butadiene-carboxylic acid (16.7 g.). B: N-(2-hydroxy-ethyl)-piperazine (6.5 g.). | cf. Example 19 | Viscous | 187° C., 8 g. |
| 25 | 2-methyl-4,4-bis-(4-chloro-phenyl)-butadiene-carboxylic-acid-N'-(2-diethyl-amino-ethyl)-piperazide. | A: 2-methyl-4,4-bis-(4-chlorophenyl)-butadiene-carboxylic acid (16.7 g.). B: N-(2-diethyl-aminoethyl)-piperazine (9.3 g.). | A,B in acetic ester. Shaking with dilute hydrochloric acid. Addition of sodium hydroxide solution. | Viscous | 222° C., 20 g. |
| 26 | 2-methyl-4,4-bis-(4-chloro-phenyl)-butadiene-carboxylic-acid-N'-dodecyl-piperazide. | A: 2-methyl-4,4-bis-(4-chlorophenyl)-butadiene-carboxylic acid (10.5 g.). B: N-dodecyl-piperazine (8 g.). | A,B in acetic ester, dissolving viscous hydrochloride in methanol, rendering alkaline and extracting with ether. | Viscous | From strongly concentrated acetic ester solution, 99° C., 12.5 g., insoluble in water. |

As far as no indications are given in the table for the water-solubility of the hydrochlorides, they are readily soluble.

The butadiene-carboxylic acids (reaction component A) required as starting substances for the preparation of the afore-mentioned products are obtained in analogy to Example 1 from a corresponding benzophenone by the reaction with dimethyl-acrylic ester. For those benzophenones that are not known from the relevant literature, melting point and production method are indicated in the following table.

| Addition to Example— | Reaction component A | Prepared from— | Properties melting point, yield |
|---|---|---|---|
| 2 | 2-methyl-4-phenyl-4-(3,4-dichloro-phenyl)-butadiene-carboxylic acid. | a: 3,4-dichloro-benzophenone (190 g.). b: dimethyl-acrylic ester (56 g.). | 179° C. (methanol), 68 g. |
| 3 | 2-methyl-4-(4'-chloro-phenyl)-4-(3,5-dichloro-phenyl)-butadiene-carboxylic acid. | a: 4-chloro-3,5-dichloro-benzophenone (118 g.); (melting point 82° C. from 3,5-dichloro-benzene, chlorobenzene, AlCl₃). b: dimethyl-acrylic ester (55 g.). | 181° C. (methanol), 53 g. |
| 4 | 2-methyl-4-phenyl-4-(3,5-dichloro-phenyl)-butadiene-carboxylic acid. | a: 3,5-dichloro-benzophenone (107 g.). b: dimethyl-acrylic ester (56 g.). | 181° C., 52 g. |
| 5 | 2-methyl-4-(4-chloro-phenyl)-4-(4-bromo-phenyl)-butadiene-carboxylic acid. | a: 4-chloro-4-bromobenzophenone (137 g.). b: dimethyl-acrylic ester (63 g.). | 190° C. (methanol), 101 g. |
| 6 | 2-methyl-4-(4-chloro-phenyl)-4-(2,4-dichloro-phenyl)-butadiene-carboxylic acid. | a: 2,4-dichloro-benzophenone (93 g.). b: dimethyl-acrylic ester (48 g.). | 83° C. (methanol), 40 g. |
| 7 | 2-methyl-4,4-bis-(4-bromo-phenyl)-butadiene-carboxylic acid. | a: 3,4-dibromo-benzophenone (88 g.). b: dimethyl-acrylic ester (32 g.). | 192° C. (methanol), 53 g. |
| 8 | 2-methyl-4-(4-chloro-phenyl)-4-(2,4-dichlorophenyl)-butadiene-carboxylic acid. | a: 4-chloro-2,4-dichloro-benzophenone (101 g.). b: dimethyl-acrylic ester (45 g.). | 147° C. (ligroine), 165 g. |
| 9 | 2-methyl-4-(4-chloro-phenyl)-4-(2-chloro-phenyl)-butadiene-carboxylic acid. | a: 2,4-dichloro-benzophenone (120 g.). b: dimethyl-acrylic ester (61 g.). | Acid precipitating in viscous form is to be taken up in ether, evaporated; petroleum ether is added. 138° C. (ligroine), 61 g. |
| 10 | 2-methyl-4-(4-chloro-phenyl)-4-(4-methyl-phenyl)-butadiene-carboxylic acid. | a: 4-chloro-4-methyl-benzophenone (83 g.). b: dimethyl-acrylic ester (47 g.). | 201° C. (methanol), 44 g. |
| 11 | 2-methyl-4-(4-chloro-phenyl)-4-(3-chloro-phenyl)-butadiene-carboxylic acid. | a: 3,4-dichloro-benzophenone (162 g.). b: dimethyl-acrylic ester (82.6 g.). | 192° C. or 156° C. (stereo-isomers) (twice from ethanol, then from glacial acetic acid/water) 150 g. |
| 13 | 2-methyl-4-(4-chloro-phenyl)-4-(2-methyl-phenyl)-butadiene-carboxylic acid. | a: 2-methyl-4-chloro-benzophenone (145 g.). b: dimethyl-acrylic ester (80 g.). | 139° C. (ligroine), 46 g. |

| Addition to Example— | Reaction component A | Prepared from— | Properties melting point, yield |
|---|---|---|---|
| 14 | 2-methyl-4-(4-methyl-phenyl)-4-(2-chloro-phenyl)-butadiene-carboxylic acid. | a: 2-chloro-4-methyl-benzophenone (103 g.). <br> b: dimethyl-acrylic ester (58 g.). | 195° C. (methanol), 46 g. |
| 15 | 2-methyl-4-(4-methyl-phenyl)-4-(2,4-diphenyl)-butadiene-carboxylic acid. | a: 2,4-dichloro-4-methyl-benzophenone (79 g.); melting point 59° C., from 2,4-dichloro-benzoyl-chloride, toluene, AlCl₃). <br> b: dimethyl-acrylic ester (39 g.). | 185° C. (ethanol), 24 g. |
| 16 | 2-methyl-4-(4-chloro-phenyl)-4-(4-chloro-diphenyl)-butadiene carboxylic acid. | a: 4-chloro-4-(p-chloro-phenyl)-benzophenone (181 g.), melting point 192° C., from 4-chlorobenzoylchloride, 4-chlorodiphenyl, AlCl₃). <br> b: dimethyl-acrylic ester (72 g.). | 197° C. (methylglycol/methanol), 107 g. |
| 17 | 2-methyl-4-(4-chloro-phenyl)-4-(2-chloro-5-methyl-phenyl)-butadiene carboxylic acid. | a: 2,4-dichloro-5-methyl-benzophenone (164 g.); melting point 93° C. from 2-chloro-5-methyl-benzoyl-chloride, chloro-benzene, AlCl₃). <br> b: dimethyl-acrylic ester (80 g.). | 170° C. (methanol), 83 g. |

*Example 27.*—*2-methyl-4,4-bis-(4-methyl-phenyl)-butadiene-carboxylic-acid-N'-methyl-piperazide*

5.4 grams of chloroformic acid ethyl ester are added to a mixture of 14.6 grams of 2-methyl-4,4-bis-(4-methyl-phenyl)-butadiene-carboxylic acid, 200 milliliters of dioxane and 5 grams of triethyl amine while cooling thoroughly at temperatures ranging from −10° C. and 0° C., and stirring is continued for a further 10 minutes. A solution of 5 grams of N-methyl-piperazine in 20 milliliters of dioxane is dropwise added while cooling thoroughly, stirring is continued for 1 hour at 0° C. and for a further 3 hours at room temperature. The precipitated triethylamine hydrochloride is then filtered off with suction, the filtrate is concentrated by vaporation in vacuo, the oily residue is mixed with water and ether and the separated ethereal layer is extracted by shaking with dilute hydrochloric acid. By the addition of sodium hydroxide solution until alkaline reaction occurs, the base is set free, and taken up in ether. After having evaporated the ether and on treating the residue with petroleum ether 8 grams of 2-methyl-4,4-bis-(4'-methyl-phenyl)-butadiene-carboxylic-acid-N'-methyl-piperazide crystallize, melting at 127° C. (from petroleum ether). The hydrochloride prepared from said substance according to Example 1 melts at 206° C. and is very readily soluble in water.

The 2-methyl-4,4-bis-(4'-methyl-phenyl)-butadiene-carboxylic acid used as starting substance is obtained according to Example 1 from 111 grams of 4,4'-dimethyl-benzophenone and 68 grams of dimethyl acrylic ester in a yield of 108 grams. The 2-methyl-4,4-bis-(4'-methyl-phenyl)-butadiene-carboxylic acid melts at 206° C. (from methanol).

In an analogous manner there are obtained the piperazides indicated in the following table from N-methyl-piperazine (reaction component B') and the mixed anhydride which is formed from the corresponding butadiene-carboxylic acid (reaction component A') and chloroformic acid ethyl ester:

| Example | Product obtained | Reaction components | Properties melting point, yield | |
|---|---|---|---|---|
| | | | Free base | Hydrochloride |
| 28 | 2-methyl-4-(4-chlorophenyl)-4-[4-(pchlorophenoxy)-phenyl]-butadiene carboxylic-acid-N'-methyl-piperazide. | A': 2-methyl-4-(4-chloro-phenyl)-4-[4-(p-chlorophenoxy)-phenyl]-butadiene-carboxylic acid (21.2 g.). <br> B': 7 g. | Viscous | Solution in methanol, filtration, evaporation, triturating with acetic ester 210° C., 12 g. |
| 29 | 2-methyl-4-(4-methylphenyl)-4-(3-methylphenyl)-butadiene-carboxylic-acid-N'-methylpiperazide. | A': 2-methyl-4-(4-methylphenyl)-4-(3-methylphenyl)-butadiene-carboxylic acid. <br> B': 7 g. | Viscous | 194° C., 10.5 g. |
| 30 | 2-methyl-4-(4-methyl-phenyl)-4-(2-methyl-phenyl)-butadiene-carboxylic-acid-N'-methyl-piperazide. | A': 2-methyl-4-(4-methyl-phenyl)-4-(2-methyl-phenyl)-butadiene-carboxylic acid (14.6 g.). <br> B': 7 g. | Viscous | 218° C., 12 g. |
| 31 | 2-methyl-4-(4-methyl-phenyl)-4-(3-methyl-5''-chloro-phenyl)-butadiene-carboxylic-acid-N'-methyl-piperazide. | A': 2-methyl-4-(4-methyl-phenyl)-4-(3-methyl-5''-chloro-phenyl)-butadiene-carboxylic acid (16.5 g.). <br> B': 7 g. | Viscous | 215° C., 13 g. |
| 32 | 2-methyl-4-(4-chloro-phenyl)-4-(3-methyl-phenyl)-butadiene-carboxylic-acid-N'-methyl-piperazide. | A': 2-methyl-4-(4-chloro-phenyl)-4-(3-methyl-phenyl)-butadiene-carboxylic acid (15.6 g.) melting point 185° C. <br> B': 7 g. | Viscous | 199° C., 12.6 g. |
| 33 | 2-methyl-4-(4-chloro-phenyl)-4-(3-methyl-phenyl)-butadiene-carboxylic-acid-N'-methyl-piperazide. | A': 2-methyl-4-(4-chloro-phenyl)-4-(3-methyl-phenyl)-butadienecarboxylic acid (15.6 g.) melting point 137° C. (stereoisomer to 32 A'). <br> B': 7 g. | Viscous | 205° C., 12.5 g. |
| 34 | 2-methyl-4-(4-methyl-phenyl)-4-(3,5-dichloro-phenyl)-butadiene-carboxylic-acid-N'-methyl-piperazide. | A': 2-methyl-4-(4-methyl-phenyl)-4-(3,5-dichlorophenyl)-butadiene-carboxylic acid (17.4 g.). <br> B': 7 g. | Viscous | 128° C., 8 g. |
| 35 | 2-methyl-4-phenyl-4-(4-chloro-phenyl)-butadiene-carboxylic-acid-N'-methyl-piperazide. | A': 2-methyl-4-phenyl-4-(4-chloro-phenyl)-butadiene-carboxylic acid (15 g.). <br> B': 7 g. | Viscous | 206° C., 8.7 g. |
| 36 | 2-methyl-4-(4-chlorophenyl)-4-(4-methoxyphenyl)-butadiene-carboxylic-acid-N'-methylpiperazide. | A': 2-methyl-4-(4-chlorophenyl)-4-(4-methoxy-phenyl)-butadiene-carboxylic acid (16.5 g.). <br> B': 7.7 g. | Viscous | 206° C., 11 g. |

| Example | Product obtained | Reaction components | Properties melting point, yield | |
|---|---|---|---|---|
| | | | Free base | Hydrochloride |
| 37 | 2-methyl-4-(2-chlorophenyl)-4-(4-methoxyphenyl)-butadiene-carboxylic-acid-N'-methyl-piperazide. | A': 2-methyl-4-(2-chlorophenyl)-4-(4-methoxy-phenyl)-butadiene-carboxylic acid (16.5 g.). B': 7.7 g. | 126° C. (ligroine) | 165° C., 11.5 g. |
| 38 | 2-methyl-4-(2,4-dichloro-phenyl)-4-(4''-methoxy-phenyl)-butadiene-carboxylic-acid-N'-methyl-piperazide. | A': 2-methyl-4-(2,4-dichloro-phenyl)-4-(4-methoxy-phenyl)-butadiene-carboxylic acid (18.2 g). B': 7.7 g. | Viscous | 206° C., 12 g. |
| 39 | 2-methyl-4-(4-methylphenyl)-4-(4-methoxyphenyl)-butadiene-carboxylic acid-N'-methyl-piperazide. | A': 2-methyl-4-(4-methylphenyl)-4-(4-methoxyphenyl)-butadiene-carboxylic acid (15.4 g.). B': 7.7 g. | Viscous | 192° C., 11 g. |
| 40 | 2-methyl-4-(4-chloro-phenyl)-4-(4-fluoro-phenyl)-butadiene-carboxylic acid-N'-methyl-piperazide. | A': 2-methyl-4-(4-chloro-phenyl)-4-(4-fluoro-phenyl)-butadiene-carboxylic acid (16 g.). B': 7 g. | 138° C. (ligroine) | 216° C., 12 g. |
| 41 | 2-methyl-4-(4-chloro-phenyl)-4-(3-methyl-4-chloro-phenyl)-butadiene-carboxylic-acid -N'-methyl-piperazide. | A': 2-methyl-4-(4-chloro-phenyl)-4-(3-methyl-4-chloro-phenyl)-butadiene-carboxylic acid (17.5 g.). B': 7 g. | Viscous | 224° C., 10.3 g. |

*Example 42.—2-methyl-4,4-bis-(4 -methyl-phenyl)-butadiene-carboxylic-acid-N'-methyl-piperazide*

To a solution of 14.6 grams of 2-methyl-4,4-bis-(4-methyl-phenyl)-butadiene-carboxylic acid in 150 milliliters of dioxane there are added 5 grams of N-methyl-piperazine and subsequently 10.2 grams of cyclohexyl-amine-carbo-diimide while stirring. The reaction mixture is stirred for 4 hours at 25° C. The urea formed is then filtered off with suction, the filtrate is concentrated by evaporation in vacuo, the oily residue is mixed with water and ether, and the separated ethereal layer is extracted by shaking with dilute hydrochloric acid. By the addition of sodium hydroxide solution until alkaline reaction occurs, the base is set free and taken up in ether. After having evaporated the ether and on treating the residue with petroleum ether, 3.5 grams of 2-methyl-4,4-bis-(4'-methyl - phenyl)-butadiene - carboxylic - acid-N'-methyl-piperazide crystallize, melting at 127° C.

The butadiene-carboxylic acids (reaction component A') required as starting substances for the preparation of the afore-mentioned products are obtained in analogy to Example 1 from a corresponding benzophenone by the reaction with dimethyl-acrylic ester. For those benzophenones that are not known from the relevant literature, melting point and production method are indicated in the following table.

| Addition to Example— | Reaction component A' | Prepared from— | Properties melting point, yield |
|---|---|---|---|
| 28 | 2-methyl-4-(4 -chloro-phenyl)-4[4-(p-chloro-phenoxy)-phenyl]-butadiene carboxylic acid. | a': 4-chloro-4 -(p-chloro-phenoxy)-benzophenone (114 g.); melting point 152° C., from p-chloro-benzoyl-chloride, 4-chloro diphenyl-ether AlCl₃). b': dimethyl-acrylic ester (43 g.). | 163° C. (methanol), 72 g. |
| 29 | 2-methyl-4-(4 -methyl-phenyl)-4-(3-methyl-phenyl)-butadiene carboxylic acid. | a': 3,4 -dimethyl-benzophenone (98 g.). b': dimethyl-acrylic ester (95 g.). | 172° C. (methanol), 95 g. |
| 30 | 2-methyl-4-(4 -methyl-phenyl)-4-(2-methyl-phenyl)-butadiene-carboxylic acid. | a': 2,4 -dimethyl-benzophenone (131 g.). b': dimethyl-acrylic ester (80 g.). | 198° C. (methanol), 48 g. |
| 31 | 2-methyl-4-(4-methyl-phenyl)-4-(3-methyl-5-chloro-phenyl)-butadiene-carboxylic acid. | a': 3,4-dimethyl-5-chloro-benzophenone (107 g.); (from 3-methyl-5-chloro-benzoyl-chloride, toluene, AlCl₃). b': dimethyl-acrylic ester (57 g.). | 188° C. (methanol), 36 g. |
| 32 | 2-methyl-4-(4-chloro-phenyl)-4-(3-methyl-phenyl)-butadiene-carboxylic acid. | a': 3-methyl-4-chloro-benzophenone (98 g.) (melting point 107° C., from 3-methyl-benzoyl-chloride chlorobenzene, AlCl₃). b': dimethyl-acrylic ester (56 g.). | 185° C. or 137° C. (stereoisomers) (from methanol), 129 g. |
| 34 | 2-methyl-4-(4-methyl-phenyl)-4-(3,5-dichloro-phenyl)-butadiene-carboxylic acid. | a': 3,5-dichloro-4-methyl-benzophenone (102 g.); (melting point 68° C., from 3,5-dichloro-benzoyl-chloride, toluene, AlCl₃). b': dimethyl-acrylic ester (53 g.). | 170° C. (methanol), 40 g. |
| 35 | 2-methyl-4-phenyl-4-(4-chloro-phenyl)-butadiene-carboxylic acid. | a': 4-chloro-benzophenone (151 g.). b': dimethyl-acrylic ester (90 g.). | 147° C. (methanol), 48 g. |
| 36 | 2-methyl-4-(4-chloro-phenyl)-4-(4-methoxy-phenyl)-butadiene-carboxylic acid. | a': 4-chloro-4-methoxy-benzophenone (107 g.). b': dimethyl-acrylic ester (56 g.). | 174° C. (isopropanol), 63 g. |
| 37 | 2-methyl-4-(2-chloro-phenyl)-4-(4-methoxy-phenyl)-butadiene-carboxylic acid. | a': 2-chloro-4-methoxy-benzophenone (99 g.). b': dimethyl-acrylic ester (52 g.). | 145° C. (methanol), 33 g. |
| 38 | 2-methyl-4-(2,4-dichloro-phenyl)-4-(4-methoxy-phenyl)-butadiene-carboxylic acid. | a': 2,4-dichloro-4-methoxy-benzophenone (113 g.); (melting point 53° C. from 2,4-dichloro-benzoyl-chloride, anisole, AlCl₃). b': dimethyl-acrylic ester (51 g.). | 172° C. (methanol), 38 g. |
| 39 | 2-methyl-4-(4-methylphenyl)-4-(4-methoxyphenyl)-butadiene-carboxylic acid. | a': 4-methyl-4-methoxy-bensophenone (83 g.). b': dimethyl-acrylic ester (48 g.). | 189° C. (methanol), 45 g. |

| Addition to Example— | Reaction component A' | Prepared from— | Properties melting point, yield |
|---|---|---|---|
| 40 | 2-methyl-4-(4-chlorophenyl)-4-(4-fluorophenyl)-butadiene-carboxylic acid. | a': 4-chloro-4-fluoro-benzophenone (216 g.); (melting point 117° C., from 4-chlorobenzoyl-chloride, fluorobenzene, AlCl₃). b': dimethyl-acrylic ester (126 g.). | 189° C. (methanol), 118 g. |
| 41 | 2-methyl-4-(4-chlorophenyl)-4-(3-methyl-4''-chloro-phenyl)-butadiene-carboxylic acid. | a': 3-methyl-4,4-dichloro-benzophenone (126 g.); (melting point 120° C., from 3-methyl-4-chlorobenzoyl-chloride, chlorobenzene, AlCl₃). b': dimethyl-acrylic ester (62 g.). | 171° C. (methanol), 34 g. |

We claim:
1. The compounds selected from the group consisting of (i) carboxylic acid piperazides of the formula

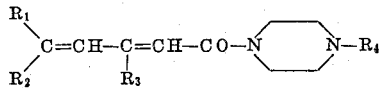

in which $R_1$ and $R_2$ each are members selected from the group consisting of phenyl and phenyl substituted by groups which are members selected from the group consisting of halogen, lower alkyl, lower alkoxy, phenyl, halophenyl, phenoxy and chlorophenoxy, $R_3$ is a member selected from the group consisting of methyl, 2-phenyl-vinyl and 2-phenyl-vinyl which is substituted in the benzene nucleus by groups which are members selected from the group consisting of halogen, lower alkyl and lower alkoxy, $R_4$ is a member selected from the group consisting of hydrogen, alkyl, β-hydroxy-ethyl, β-γ-dihydroxy-propyl, β-hydroxy-γ-chloro-propyl, methoxy-methyl, β-methoxy-ethyl, cyclo-hexyl, methyl-cyclohexyl, benzyl, 4-chlorobenzyl, 4-methyl-benzyl, phenyl-ethyl, ethyl-mercapto-methyl, ethyl-mercapto-ethyl, benzyl-mercapto-methyl, benzyl-mercapto-ethyl and diethyl aminoethyl, and (ii) salts of said compounds with physiologically tolerable acids.

2. 2 - methyl - 4,4 - bis - (4 - chloro - phenyl) - butadiene-carboxylic-acid-N'-methyl-piperazide.

3. 2 - methyl - 4 - (4 - chloro - phenyl) - 4 - (3,5 - dichloro - phenyl) - butadiene - carboxylic-acid-N'-methyl-piperazide.

4. 2 - methyl - 4 - (4 - chloro - phenyl) - 4 - (4 - methyl-phenyl) - butadiene - carboxylic - acid - N' - methyl-piperazide.

5. 2 - methyl - 4 - (4 - chloro - phenyl) - 4 - (4 - fluoro-phenyl) - butadiene - carboxylic - acid - N' - methyl- piperazide.

6. 2 - methyl - 4,4 - bis - (4 - methyl - phenyl) - butadiene-carboxylic-acid-N'-methyl-piperazide.

7. 2 - methyl - 4 - (2 - chloro - phenyl) - 4 - (4 - methoxy - phenyl) - butadiene - carboxylic - acid - N' - methyl-piperazide.

8. 2 - methyl - 4 - (4 - chloro - phenyl) - 4 - [4 - (p-chloro - phenoxy) - phenyl] - butadiene - carboxylic-acid-N'-methyl-piperazide.

9. 2 - [β - (4 - chloro - phenyl) - vinyl] - 4,4 - bis - (4-chloro - phenyl) - butadiene - carboxylic - acid - N'-methyl-piperazide.

10. An acid addition salt of 2-methyl-4,4-bis-(4-chlorophenyl) - butadiene-carboxylic-acid-N'-methyl-piperazide with a physiologically tolerable acid.

11. An acid addition salt of 2-methyl-4-(4-chlorophenyl) - 4 - (3,5 - dichlorophenyl) - butadiene - carboxylic-acid-N'-methyl-piperazide with a physiologically tolerable acid.

12. An acid addition salt of 2-methyl-4-(4-chlorophenyl)-4-(4-methylphenyl) - butadiene - carboxylic -acid-N'-methyl-piperazide with a physiologically tolerable acid.

13. An acid addition salt of 2-methyl-4-(4-chlorophenyl) - 4 - (4 - fluorophenyl) - butadiene - carboxylic - acid-N'-methyl-piperazide with a physiologically tolerable acid.

14. An acid addition salt of 2-methyl-4,4-bis-(4-methylphenyl) - butadiene - carboxylic - acid - N' - methyl-piperazide with a physiologically tolerable acid.

15. An acid addition salt of 2-methyl-4-(2-chlorophenyl) - 4 - (4 - methoxyphenyl) - butadiene - carboxylic-acid-N'-methyl-piperazide with a physiologically tolerable acid.

16. An acid addition salt of 2-methyl-4-(4-chlorophenyl) - 4 - [4 - (p - chlorophenoxy) - phenyl] - butadiene-carboxylic-acid-N'-methyl-piperazide with a physiologically tolerable acid.

17. An acid addition salt of 2-[β-(4-chlorophenyl)-vinyl] - 4,4 - bis - (4 - chlorophenyl) - butadiene - carboxylic-acid-N'-methyl-piperazide with a physiologically tolerable acid.

References Cited by the Examiner

UNITED STATES PATENTS

| 2,882,271 | 4/1959 | Janssen | 260—268 XR |
| 2,954,380 | 9/1960 | Shapiro et al. | 260—268 |
| 2,976,290 | 3/1961 | Parcell | 260—268 |
| 3,098,005 | 7/1963 | Hodge | 167—53 |
| 3,099,599 | 7/1963 | Copp et al. | 167—53 |

IRVING MARCUS, *Primary Examiner.*

NICHOLAS S. RIZZO, *Examiner.*